United States Patent [19]

Asano et al.

[11] Patent Number: 4,757,552
[45] Date of Patent: Jul. 12, 1988

[54] METHOD FOR PROCESSING BINARY IMAGE DATA

[75] Inventors: Hido Asano, Machida; Eisuke Kanzaki; Yutaka Shimizu, both of Fujisawa, all of Japan

[73] Assignee: International Business Machines Corporation, Armonk, N.Y.

[21] Appl. No.: 787,401

[22] Filed: Oct. 15, 1985

[30] Foreign Application Priority Data

Oct. 24, 1984 [JP] Japan ................. 59-222292

[51] Int. Cl.[4] .............................................. G06K 9/36
[52] U.S. Cl. ...................... 382/54; 358/261; 382/56
[58] Field of Search .................. 382/56, 54; 358/261

[56] References Cited

U.S. PATENT DOCUMENTS

| | | | |
|---|---|---|---|
| 4,204,232 | 5/1980 | Mizuo | 382/56 |
| 4,229,768 | 10/1980 | Kurahayashi et al. | 382/56 |
| 4,291,339 | 9/1981 | Ogawa et al. | 358/260 |
| 4,300,122 | 11/1981 | McMahon | 382/56 |
| 4,307,377 | 12/1981 | Pferd et al. | 382/56 |

FOREIGN PATENT DOCUMENTS 2450073 10/1974 Fed. Rep. of Germany .
58-88970 5/1983 Japan .

OTHER PUBLICATIONS

Nikkei Electronics—11/3/75—pp. 30–34.
CCITT Recommendation T.4–Geneva 1980.

*Primary Examiner*—Leo H. Boudreau
*Attorney, Agent, or Firm*—Kenneth A. Seaman

[57] ABSTRACT

A method for processing binary image data in preparation for further compression in accordance with a table based upon distances between transitions in successive lines. Advantageously, three lines are considered at one time and the spatial relationship between the transitions in the first and second lines and said second and third lines controls the amount of data compression to be accomplished.

4 Claims, 9 Drawing Sheets

METHOD FOR PROCESSING BINARY IMAGE DATA

BACKGROUND OF THE INVENTION

1. Field of the Invention

The invention relates to a method for processing binary image data (black/white representations of images) supplied from an image data supply means, such as an image scanner, before being compressed by a data compressor.

2. Prior Art

An article in NIKKEI ELECTRONICS dated Nov. 3, 1975, at pages 30–34, describes a preprocessing method for image data which is adaptable to run-length coding. In the article, black image data and white image data of a reference line and a coding line (current picture element (PELS) or scan line) are so rearranged that the black image data, i.e. black bits, are grouped into a left half of a new line and the white image data, i.e. white bits are grouped into a right half of the new line. The left half is called an A1 sequence and the right half is called an A2 sequence. Although the article relates to a preprocessing method for the image data, details of the process for the rearrangement of the image data of the article differ from that of the present invention.

The prior art preprocessing of image data such as described in the referenced article requires a complicated rearrangement of the image data for both compression and decompression processes. A simple, yet effective preprocessing system for binary image data, using a two-dimensional coding scheme for an improved compression ratio, does not presently exist.

Japanese published patent application No. 58-88970 discloses another method of preprocessing image data before supplying the image data to a compression means. The two-dimensional coding or compression scheme of CCITT is prepared for the image data of 8 PEL/MM density. The application is capable of compressing image data of other PEL density than the 8 PELS/MM by use of the compression means for the 8 PEL/MM image. If the image data has 16 PEL/MM density, the application converts the 16 PEL/MM data to the 8 PEL/MM data, and the converted data is compressed by the compression means for the 8 PEL/MM data.

Some prior art compression techniques also have the disadvantage of reducing the image quality in that an image which is compressed, then decompressed to its original resolution lacks sharpness and detail when compared to the original image. In other prior art systems, lack of effective image compression hinders data transmission (requiring greater transmission time and resources).

Accordingly, the prior art pre-processing systems for handling binary image data have undesirable disadvantages and limitations.

SUMMARY OF THE INVENTION

The present invention overcomes limitations and disadvantages of the prior art by preprocessing binary image data supplied from an image supply means, such as an image scanner, before being supplied to a means, for compressing the image data under a two-dimensional coding scheme such as CCITT Recommendation T.4.

Comparing the invention with the prior art, the system described in the article in NIKKEI ELECTRONICS requires complex rearrangement of image data during both compression and decompression processes, so that it requires more processing time than the present invention to perform the rearrangement. The application No. 58-88970 does not compress data as efficiently as performed by the present invention. The present invention realizes a simple, yet effective, method of preprocessing image data, and also realizes an effective data transmission rate while providing an image quality in the decompressed image almost equal to the original image and requiring minimum preprocessing time.

The method of the present invention as disclosed includes steps of: (1) detecting a transition in the image data in a first scan line and a transition in the image data in a second scan line; (2) determining whether the distance between said transition in said first scan line and said transition in said second scan line is falls within a predetermined range; (3) arranging said image data to decrease said distance to a predetermined distance if said distance falls within said predetermined range; and (4) supplying said arranged image data to means for performing said compression. Throughout this patent the term "transition" relating to a change of image data (either from black to white or from white to black) is used similar to the term "changing element" in the CCITT Recommendation T.4.

More particularly, the method of the present invention in its preferred embodiment advantageously includes: detecting a first transition in a first scan line, a second transition in a second scan line and a third transition in a third scan line; determining a first distance between the first transition and the second transition and a second distance between the second transition and the third transition; rearranging said image data to selectively decrease said first or second distance to a predetermined distance based upon said first distance and second distance; and supplying said rearranged image data to a compression means for performing said compression.

The present invention thus overcomes the limitations and disadvantages of prior art preprocessing systems by providing a simple, yet effective, method of preprocessing image data. Other objects and advantages of the present invention will be apparent to those skilled in the applicable art in view of the following description of two illustrative embodiments of the present invention taken in conjunction with the appended claims and the accompanying drawings.

BEST MODE FOR CARRYING OUT THE PRESENT INVENTION

Figure 1:
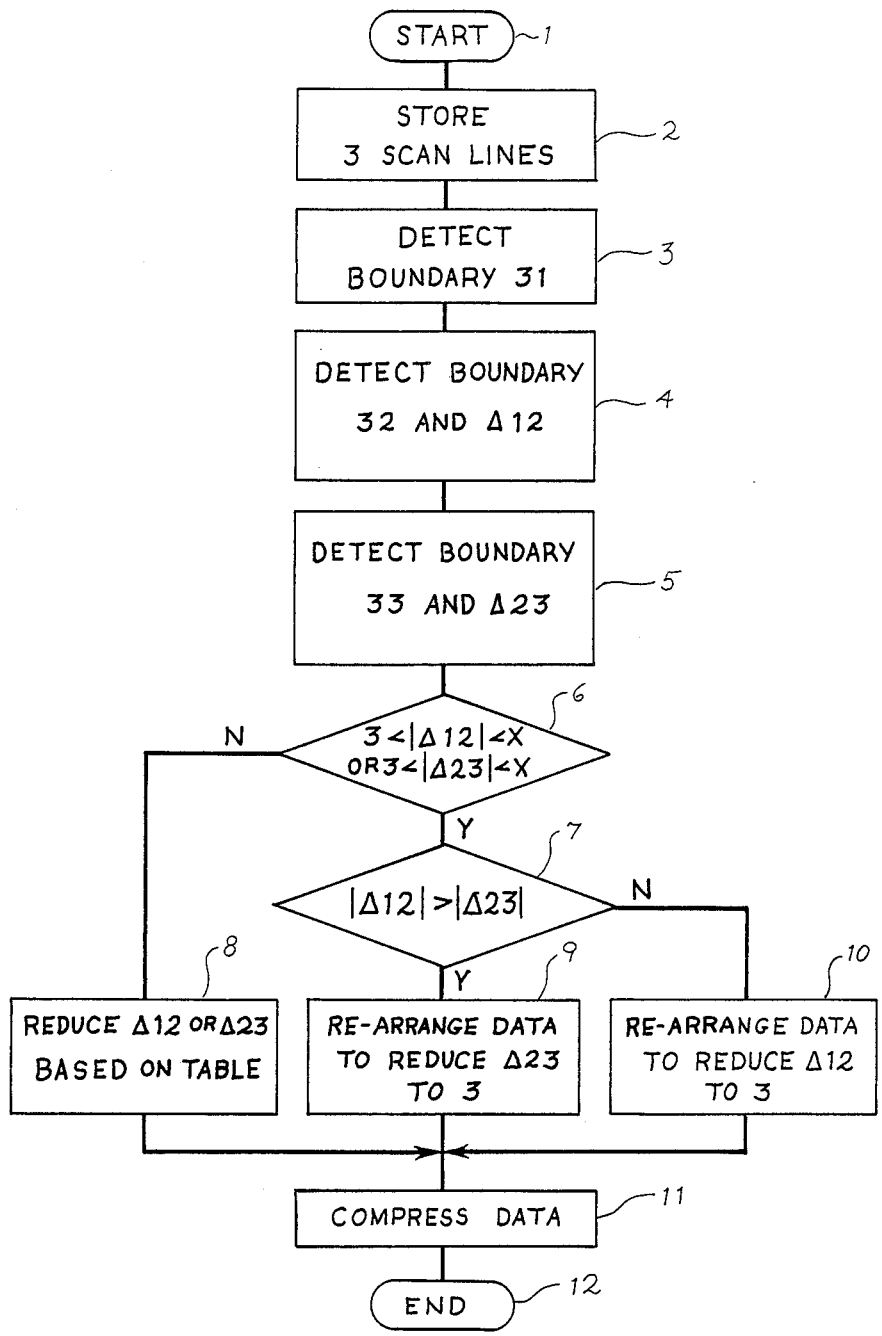
FIG. 1 shows an operational flow chart of preprocessing of image data in accordance with the preferred embodiment the present invention.

The initial operation of the preferred method of compressing data in accordance with the present invention is illustrated in blocks 1 through 5 in the FIG. 1. The operation starts at the block 1. In block 2, three scan lines are stored into a three line buffer (not shown). In block 3, the boundary 31 between the transition $C_1$ and next white element is detected. In block 4 the boundary 32 between the transition $C_2$ and the next white element is detected.

Also in the block 4, a distance $\Delta_{12}$ between the boundary 31 and the boundary 32 is determined. In block 5, the boundary 33 is detected as well as a distance $\Delta_{23}$ between the boundary 32 and the boundary 33.

The remainder of the preprocessing (shown in blocks 6-10) will be described in detail later in this patent. Block 11 is a further data compression using known techniques prior to an exit at block 12.

The present invention relates to the preprocessing of the binary image data to reduce data, prior to being compressed under a two-dimensional coding scheme such as CCITT Recommendation T.4. "CCITT" is the International Telegraph and Telephone Consultative Committee, and its recommendation T.4 appears to have been declared in Geneva in 1980.

Before describing the first embodiment of the present invention further and its use in connection with several examples, the two-dimensional coding scheme of the CCITT Recommendation T.4 will be explained.

Figure 2:
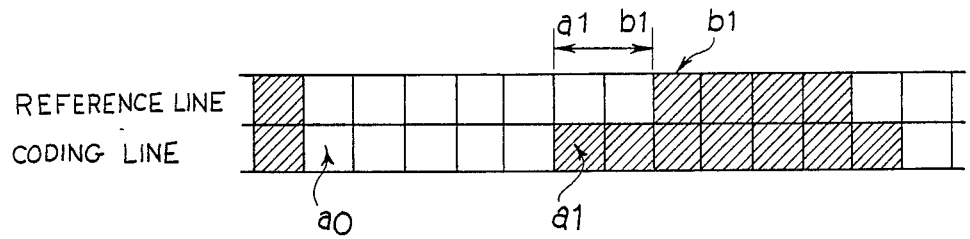
FIG. 2 shows an example of data for compression in a two-dimensional coding scheme used in connection with the flow chart of FIG. 1 present invention.

FIG. 2, respectively, in that the transitions $C_1$ and $C_2$ correspond to "$b_1$" and "$a_1$", respectively. It should also be understood that the second and third scan lines in the FIGS. 3A, 4A, 4C, 5A, 5C, 6A and 6C correspond to the reference and coding lines in the FIG. 2, respectively, the transitions $C_2$ and $C_3$ correspond to "$b_1$" and "$a_1$", respectively.

Next, a first distance $\Delta_{12}$ between the transition $C_1$ in the first scan line and the transition $C_2$ in the second scan line, and a second distance $\Delta_{23}$ between the transition $C_2$ in the second scan line and the transition $C_3$ in the third scan line. All distances referred to in this paragraph are only the horizontal component, with the vertical component ignored.

Resuming the discussion of FIG. 1, the operation proceeds from block 5 to block 6. A value of "x" has been selected prior to using the present method of reducing in accordance with the desired image fidelity. The value x is a positive integer which is selected to define the maximum length of the distance $|\Delta_{12}|$ and $|\Delta_{23}|$. The distance satisfying the condition of block 6 is reduced to the distance 3 in block 7 and block 9 or 10. The value x is experimentally selected to minimize loss of fidelity of image data and to maximize the compression efficiency. An example of the value "x" is 6. If the condition of the block 6 is not satisfied i.e., $|\Delta_{12}|$ and $|\Delta_{23}|$ are less than 4 or larger than 5 when x=6, and answer of block 6 is no and the operation proceeds to block 8. Block 8 converts the image data by reducing $|\Delta_{12}|$ or $|\Delta_{23}|$ to new distances in accordance with Table 2 when $|\Delta_{12}|$ or $|\Delta_{23}|$ is equal to 1, 2 or 3; or passes the image data without any conversion to block 11 when $|\Delta_{12}|$ or $|\Delta_{23}|$ is equal to 0 or larger than 5.

The block 6 determines as to whether either the formula $3 < |\Delta_{12}| < x$ or $3 < |\Delta_{23}| < x$ is satisfied, or not. If $|\Delta_{12}| \leq 3$ or $|\Delta_{23}| \leq 3$ as in the cases of the FIGS. 4A, 4C, 5A, 5C, 6A and 6C, the answer of the block 6 is NO and the operation proceeds to the block 8.

TABLE 1

| Mode | Element to be coded | | Notation | Code word |
|---|---|---|---|---|
| Pass | $b_1, b_2$ | | P | 0001 |
| Horizontal | $a_0a_1, a_1a_2$ | | H | 001 + $M(a_0a_1)$ + $M(a_1a_2)$ |
| Vertical | $a_1$ just under $b_1$ | $a_1b_1 = 0$ | V (0) | 1 |
| | $a_1$ to the right of $b_1$ | $a_1b_1 = 1$ | $V_R$ (1) | 011 |
| | | $a_1b_1 = 2$ | $V_R$ (2) | 000011 |
| | | $a_1b_1 = 3$ | $V_R$ (3) | 0000011 |
| | $a_1$ to the left of $b_1$ | $a_1b_1 = 1$ | $V_L$ (1) | 010 |
| | | $a_1b_1 = 2$ | $V_L$ (2) | 000010 |
| | | $a_1b_1 = 3$ | $V_L$ (3) | 0000010 |
| Extension | 2-D (extensions) | | | 0000001xxx |
| | 1-D (extensions) | | | 000000001xxx |

Referring to the FIG. 2, an exemplary pattern is shown for describing the coding scheme wherein "$a_0$" represents the reference or starting transition (i.e. the first recognized transition) on the coding line, "$a_1$" represents the next transition to the right of $a_0$ on the coding line, and "$b_1$" represents the first transition on the reference line to the right of $a_0$ and of opposite color to $a_0$. As apparent from Table 1, the code words for $|a_1b_1| \leq 3$ are relatively short length.

Describing the basic concept of the present invention with referring to the FIGS. 3A through 6D, a transition $C_1$ in a first scan line, a transition $C_2$ in a second scan line and a transition $C_3$ in a third scan line are detected.

It should be understood that the first and second scan lines in the FIGS. 3A, 4A, 4C, 5A, 5C, 6A and 6C correspond to the reference and coding lines in the and the operation proceeds to the block 8.

The distances $|\Delta_{12}|$ or $|\Delta_{23}|$ in the FIGS. 4A, 4C, 5A, 5C, 6A and 6C corresponds to one of the cases $|a_1b_1| = 1$ $|a_1b_1| = 2$ and $|a_1b_1| = 3$ shown in the Table 11. If the distance $|\Delta_{12}|$ or $|\Delta_{23}|$ corresponds to one of the three cases, the invention at the block 8, rearranges or converts the original bit patterns or image data shown in the FIGS. 4A, 4C, 5A, 5C, 6A and 6C to the bit patterns shown in the FIGS. 4B, 4D, 5B, 5D, 6B and 6D, respectively.

Table 2 which follows shows the bit conversion performed in the block 8 in the embodiment illustrated and described in the present application.

TABLE 2

| Distance $\Delta_{12}$ or $\Delta_{23}$ | New Distance |
|---|---|
| 1 → | 0 (FIGS. 4A–4D) |
| 2 → | 1 (FIGS. 5A–5D) |
| 3 → | 1 (FIGS. 6A–6D) |

The reasons for performing the above conversions are:

(a) The number of bits of code words for the cases $a_1b_1=0$ and $a_1b_1=1$ are one bit and three bits, respectively, as shown in the Table 1, while the number of bits of code words for the cases $a_1b_1=2$ and $a_1b_1=3$ are six bits and seven bits, and (b) The above conversion of the distance in accordance with the invention does not substantially affect image fidelity of the original image data with a fine resolution, e.g. 8 pels/mm. In other words, the original image is maintained even after the distance is converted.

The FIGS. 4A through 6D will be further described later in this description.

Figure 3A:
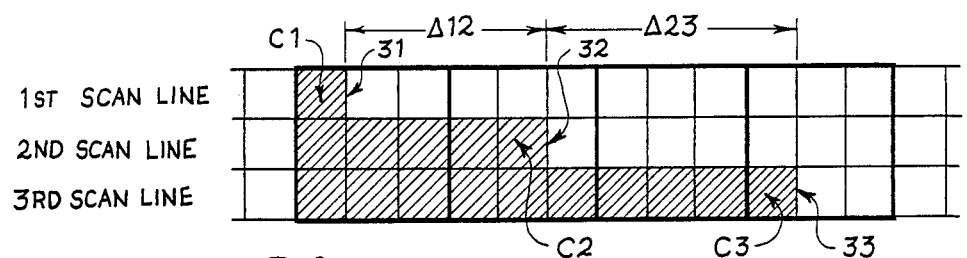
FIGS. 3A, 3B, 4A, 4B, 4C, 4D, 5A, 5B, 5C, 5D, 6A, 6B, 6C, and 6D show various different image patterns which are preprocessed in accordance with the present invention.

If either the formula $3<|\Delta_{12}|<x$ or $3<|\Delta_{23}|<x$ is satisfied, the operation proceeds from the block 6 to block 7 through YES path. FIG. 3A shows one example producing the YES from the block 6, wherein the value of $\Delta_{12}$ is "4" and the value of $\Delta_{23}$ is "5". The block 7 determines if $|\Delta_{12}|$ is larger than $|\Delta_{23}|$. For the exemplary bit pattern shown in FIG. 3A, a NO output is produced at block 7, and the operation proceeds to block 10, where the original image data of the FIG. 3A is rearranged to reduce the distance $|\Delta_{12}|$ to the value "3". The rearranged image data is shown in the FIG. 3B. The total length of $\Delta_{12}$ and $\Delta_{23}$ in the original image data is maintained after the conversion for image fidelity.

When the $|\Delta_{12}|$ is larger than $|\Delta_{23}|$, a YES output is produced at block 7, and the operation proceeds to the block 9. No example of a process including the block 9 is shown in the Figures of the present application, but it is believed to be easily understood by those skilled in the art from this description. In the block 9, $|\Delta_{23}|$ of the original binary image data is reduced to "3", without affecting the total length of $|\Delta_{12}|$ and $|\Delta_{23}|$ in the original image data.

As apparent from the above, the blocks 8, 9 and 10 rearrange the original image data to selectively decrease the distance $\Delta_{12}$ or $\Delta_{23}$ to one of predetermined distances in accordance with the result of the blocks 6 and 7.

The rearranged image data, i.e. the preprocessed image data, in accordance with the present invention, are supplied to a conventional data compression means. For example, under the two-dimensional coding scheme of the Table 1 in the block 11, and the operation terminates at the block 12.

FIGS. 4A through 6D will now be described in greater detail. FIGS. 4A and 4C, 5A and 5C and 6A and 6C show original image data, which might be binary image data from a CCD sensor array of the document or image scanning apparatus prior to the preprocessing of the present invention.

Figure 4A:
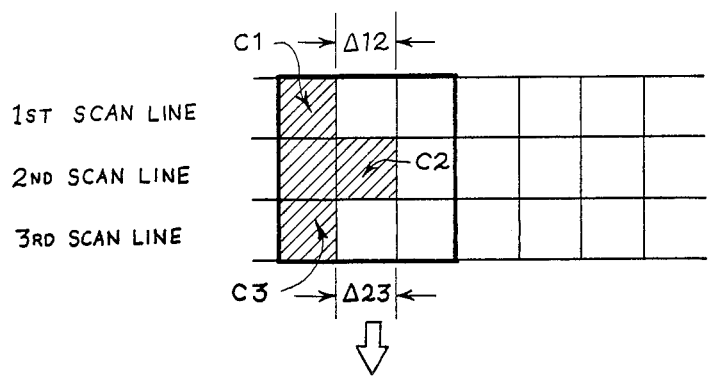
Figure 4B:
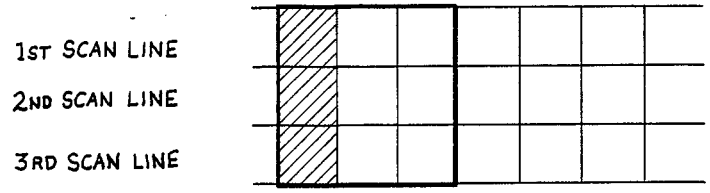
Figure 4C:
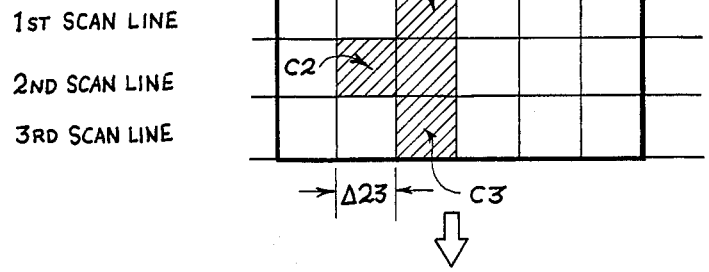
Figure 4D:
Figure 5A:
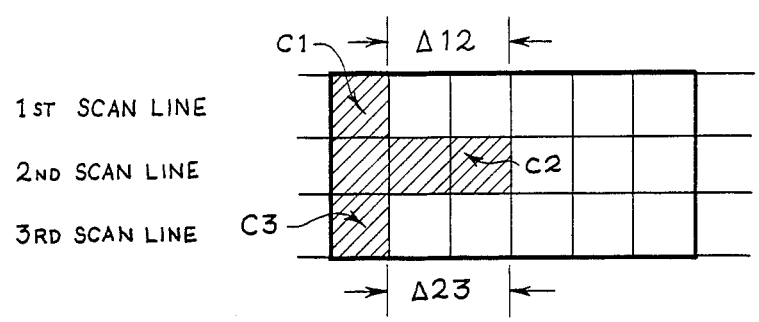
Figure 5B:
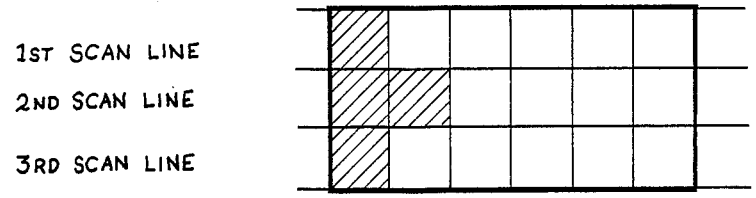
Figure 5C:
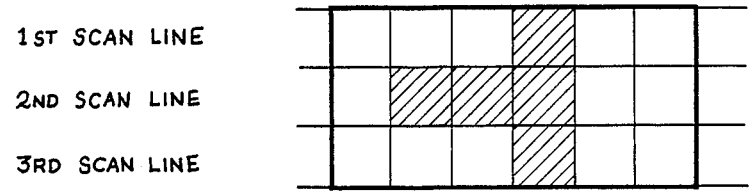
Figure 5D:
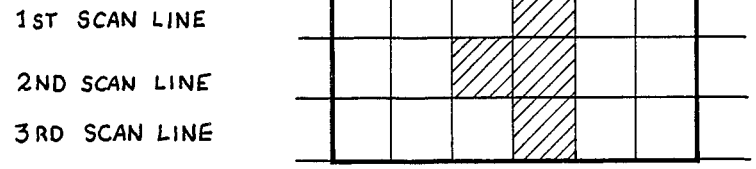
Figure 6A:
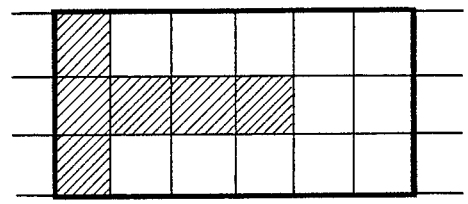
Figure 6B:
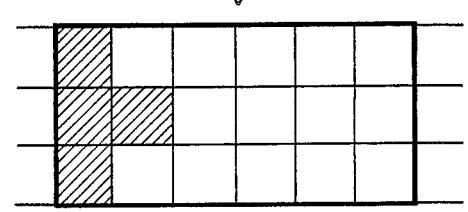
Figure 6C:
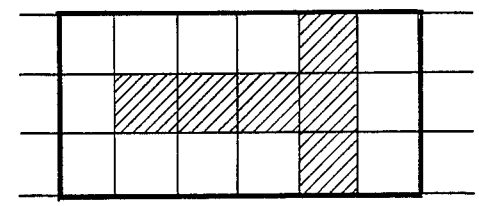
Figure 6D:
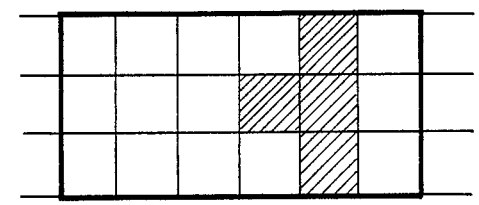

FIGS. 4A and 4C show an example of $\Delta_{12}=1$ and $\Delta_{23}=1$, FIGS. 5A and 5C show an example of $\Delta_{12}=2$ and $\Delta_{23}=2$, and the FIGS. 6A and 6C show an example of $\Delta_{12}=3$ and $\Delta_{23}=3$. The image data or bit pattern of the FIG. 4A is converted to that shown in the FIG. 4B by the previously described operation of the block 8. Similarly the conversion from FIG. 4C to FIG. 4D, from FIG. 5A to FIG. 5B, from FIG. 5C to FIG. 5D, from FIG. 6A to FIG. 6B and from FIG. 6C to FIG. 6D are performed as described above.

Figure 7:
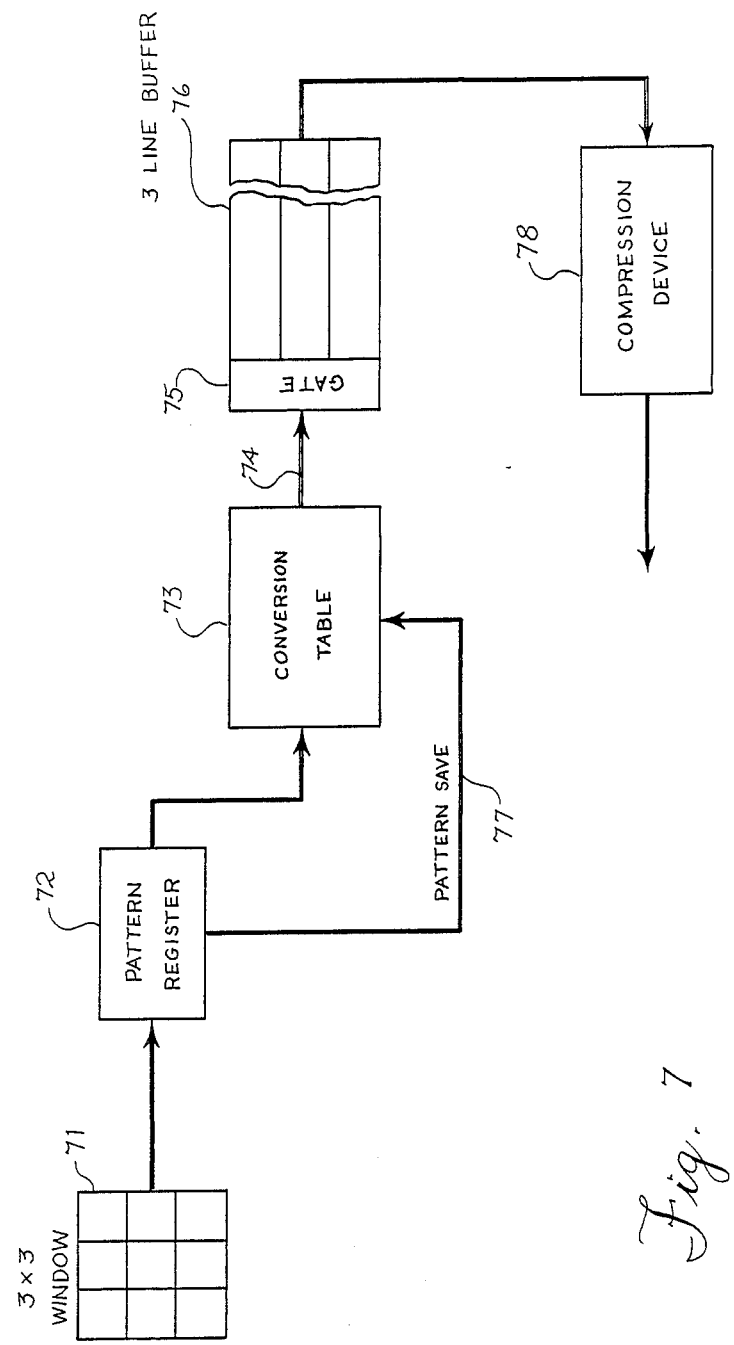
FIG. 7 shows a functional block diagram for performing the preprocessing of image data in accordance with the present invention.

FIG. 7 shows a functional block diagram for performing the operation shown in the FIG. 1 and described with respect to the FIGS. 3A through 6D.

A 3 pel×3 pel window 71 samples or picks up each 3×3 image bits in document image. The exemplary resolution is 8 pels/mm in the horizontal direction and 8 scan lines/mm in the vertical direction for one set of hardware which may be used to advantage in connection with the present invention.

The bit conversion or the preprocess of the original image data in accordance with the present invention, as shown in the FIGS. 3A through 6D, is performed by a conversion table 73. A bit pattern for each 3×3 window is applied as an address to the conversion table 73 through a pattern register 72 to fetch a desired output bit pattern on an output line 74 or a control signal "Pattern Save" on a control line 77. The pattern register 72 stores bit pattern of single 3×3 window 71 or bit pattern of plural 3×3 window 71 in response to the Pattern Save signal from the conversion table 73.

Example of the addresses and the stored bit patterns in the conversion table 73 is shown in Table 3 which follows.

TABLE 3

| Entry No. | Address | Bit Pattern |
|---|---|---|
| 1 | 100110100 (FIG. 4A) | 100100100 (FIG. 4B) |
| 2 | 001011001000000000 (FIG. 4C) | 001001001000000000 (FIG. 4D) |
| 3 | 100111100000000000 (FIG. 5A) | 100110100000000000 (FIG. 5B) |
| 4 | 000011000100100100 (FIG. 5C) | 000001000100100100 (FIG. 5D) |
| 5 | 100111100000100000 (FIG. 6A) | 100110100000000000 (FIG. 6B) |
| 6 | 00001100010110010 (FIG. 6C) | 000000000010110010 (FIG. 6D) |
| 7 | 100111111000110111000000 111000000100 (FIG. 3A) | 100111111000100111000000 111000000100 (FIG. 3B) |
| . | . | |
| . | . | |
| . | . | |
| n-6 | 001011001 | 111111111 |
| n-5 | 100111100 | 111111111 |
| n-4 | 001111001 | 111111111 |
| n-3 | 000111000 | 111111111 |
| n-2 | 100111111 | 111111111 |
| n-1 | 100111111000110111 | 111111111 |
| n | 100111111000110111000000111 | 111111111 |

For an example of the use of Table 3, it is assumed that the 3×3 window 71 samples the bit pattern shown in the FIG. 4A. The bit pattern "100" of the first scan line, "110" of the second scan line and "100" of the third scan line are serially connected to "100110100", and this serial bit pattern is stored in the pattern register 72, and then supplied to the conversion table 73. Referring to the Table 3, at entry No. 1, the conversion table 73 has the above address and generates output pattern "100100100". The output pattern "100100100" is supplied to the 3 line buffer 76 through an output line 74 and a gate 75. The gate 75 operates to assemble the serial output bit pattern "100100100" to the three line pattern shown in the FIG. 4B. Thus, the input bit pattern of the FIG. 4A has been converted to the bit pattern of the FIG. 4B.

Figure 3B:
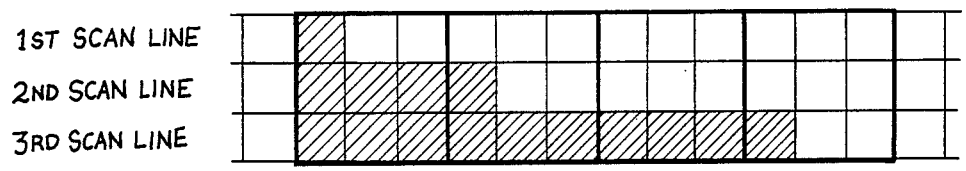

The remaining entries 2 through 7 of the Table 3 show the addresses and output bit patterns for the FIGS. 4C through 6D and the FIGS. 3A and 3B.

It is noted that in the cases of the FIGS. 4C, 5A, 5C, 6A and 6C, the bit pattern enclosed by two windows 71 is used as single address, and in the case of the FIG. 3A, the bit pattern enclosed by four windows 71 is used as single address. Now the reasons for the using plural windows for forming a single address will be explained. First referring to the FIG. 4A, its bit pattern has all "0" bits in the third column, or in other words, the boundaries from black to white for all scan lines are found in the single window. In contradistinction, the first 3×3 window of the FIG. 4C does not include the black to white transitions for all scan lines within it, so that it could not determined whether the black pel or element continues into the subsequent window, or not. Accordingly, the second window is joined to the first window. The second window contains all "0" bits in the third column, whereby the black to white transition for all lines exist within the first and second windows.

To control the joining of the subsequent window to the preceding window(s), the conversion table 73 generates the control signal "Pattern Save" on the control line 77 when a pattern, not including a black to white transition for all lines, is applied to the table 73. The Pattern Save signal has a unique pattern, e.g. "111111111" distinguishing it from output bit patterns, as shown in the entries n−6 through n in the Table 3.

For example, in the process of the bit pattern of the FIG. 3A, the supply of the bit pattern of the first 3×3 window to the conversion table 73 produces the Pattern Save signal "111111111" on the control line 77 as indicated in the entry n−2, and no output pattern is supplied to the output line 74. The Pattern Save signal applied to the pattern register 72 causes the bit pattern of the second window to be subsequently stored to the bit pattern of the first window in the pattern register 72. The combined bit pattern of the first and second window is applied to the conversion table 73 as single address, as indicated in the entry n−1, and the Pattern Save signal is again produced to the line 77. In response to the Pattern Save signal, the pattern register 72 saves the bit pattern of the third window along with the first and second bit patterns. The combined bit pattern is supplied to the conversion table 73, which generates the Pattern Save signal on the line 77, as shown in the entry n of the Table 3. Then, the pattern register 72 saves the bit pattern of the fourth window, and the combined bit pattern of the first through fourth windows is applied to the conversion table 73, as indicated in the entry 7 of the Table 3, which produces the bit pattern indicating that of the FIG. 3B on the output line 74. The output bit pattern stored in the 3 line buffer 76 through the gate 75 represents the bit pattern of the FIG. 3B.

The bit pattern in the 3 line buffer 76, which has been preprocessed in accordance with the present invention, is supplied to the compression device 78 which compresses the bit pattern from the 3 line buffer 76 in accordance with a two-dimensional coding scheme such as the CCITT Recommendation T.4.

Figure 8:
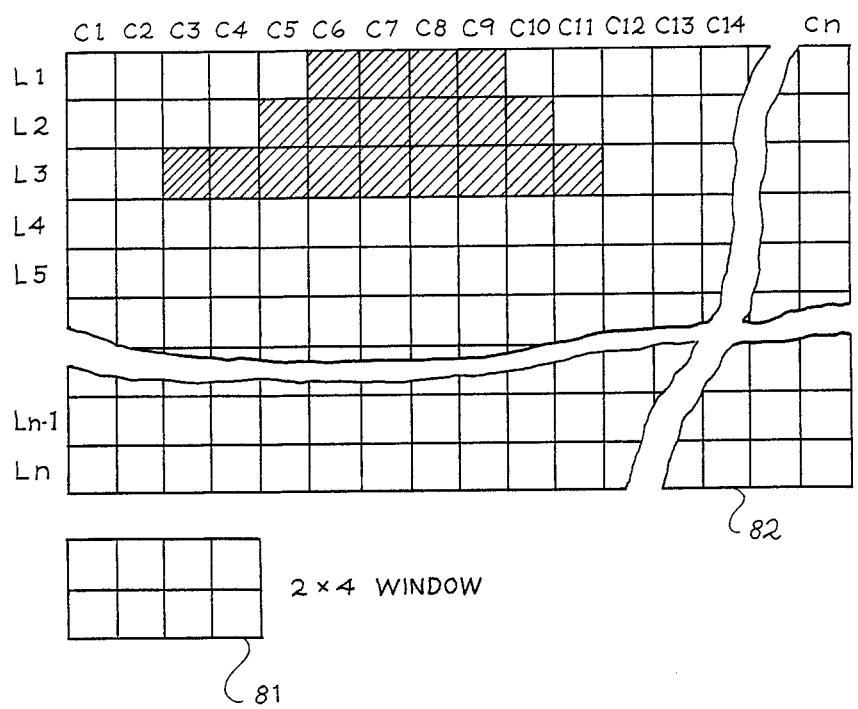
FIG. 8 shows an example of an original image used for understanding the description of a second embodiment of the present invention.
Figure 9:
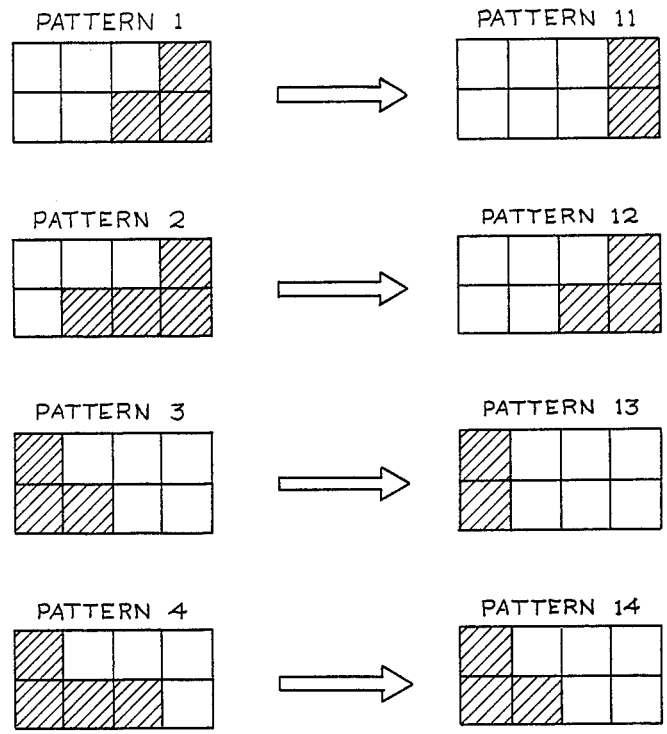
FIG. 9 shows patterns which are preprocessed in accordance with the second embodiment of the present invention.
Figure 10:
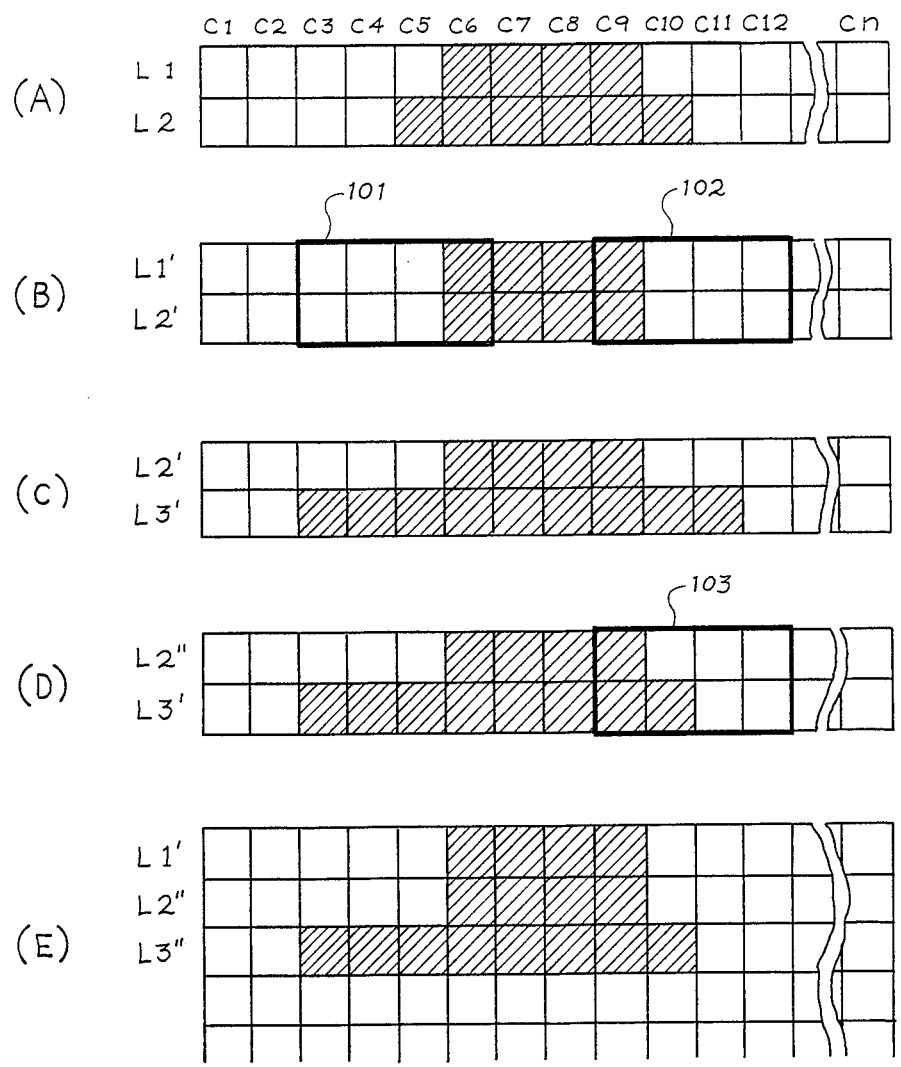
FIG. 10 shows examples of the preprocessing operation on image data in accordance with the second embodiment of the present invention.

FIGS. 8-10 illustrate a second embodiment of the present invention. In this embodiment, a window 81 having a 2 pel height and a 4 pel width (as shown in the FIG. 8) samples or picks up each 2×4 image bits in the document image 82. The start position of the 2×4 pel window is at the upper left corner of the document image 82, i.e. pels $L_1 C_1$-$L_1 C_4$ and $L_2 C_1$-$L_2 C_4$. The window 81 progressively moves or shifts towards the right most pel position $C_n$.

When the window 81 which started from the left most pel positions, e.g. the $L_1 C_1$-$L_1 C_4$ and $L_2 C_1$-$L_2 C_4$, reaches to the right edge of the scan lines $L_1$ and $L_2$ the window 81 returns to the next start position $L_2 C_1$-$L_2 C_4$ and $L_3 C_1$-$L_3 C_4$, and scans these scan lines $L_2$ and $L_3$. As the window 81 scans the document image 82, the pel conversion shown in FIG. 9 is performed. One example of the conversion is shown in FIGS. 8 and 10. Illustration (A) of FIG. 10 shows first step in which the binary image data of scan lines $L_1$ and $L_2$ are fetched into an input buffer, not shown. The 2×4 pel window is sequentially moved from the first pel $C_1$ to the last pel $C_n$. During each sequential movement, the 8 pels within the 2×4 pel window 81 are compared with the patterns 1 through 4 in FIG. 9. If a match exists, the 8 pel pattern is replaced by the corresponding pattern 11 through 14 of FIG. 9. If no match exists, no conversion or replacement is made, that is, the original pels are not changed. The fetch of the 2×4 pels and the comparison of the 2×8 pels with the patterns 1-4 in FIG. 9 could be performed by the similar (but modified) circuit arrangement as the pattern register 72 and the conversion table 73 described in connection with FIG. 7.

A match to pattern 1 of FIG. 9 is found at the pel $L_1 C_3$-$L_1 C_6$ and $L_2 C_3$-$L_2 C_6$, and these eight pels are replaced by the pattern 11. This replaced pattern 11 is shown by the solid line 101 in Illustration (B) of FIG. 10. The next match is found at pels $L_1 C_9$-$L_1 C_{12}$ and $L_2 C_9$-$L_2 C_{12}$, which matches with pattern 3 in FIG. 9. Therefore, th eight pels are replaced by pattern 13 in Illustration (B) of FIG. 9, shown by solid line 102. Thus, the preprocess of the scan lines $L_1$ and $L_2$ has been completed, as shown in Illustration (B) of FIG. 10, and the first scan line $L_1'$ is stored in the first line $L_1'$ of an output buffer, as shown in Illustration (E) of FIG. 10. In Illustration (C) of FIG. 10, the modified second line $L_2'$ from Illustration (B) of FIG. 10 and the third scan line $L_3$ of the original image data of FIG. 8 are combined and loaded into the input buffer. The 2×4 pel window moves again from the left end $C_1$ to the last pel $C_n$. When the 2×4 pel window 81 reaches the eight pels $L_2' C_9$-$L_2' C_{12}$ and $L_3 C_9$-$L_3 C_{12}$, these eight pels match with the pattern 4 of FIG. 9, and therefore these eight pels are replaced by the pattern 14 of FIG. 9. The conversion is shown by solid line 103 in Illustration (D). And, the preprocess of the scan lines $L_2'$ and $L_3$ in Illustration (C) of FIG. 10 has been completed, and the scan lines $L_2''$ thereof is stored in the scan line $L_2''$ of the output buffer shown in Illustration (E) of FIG. 10.

The next step loads the scan line $L_3'$ of Illustration (D) of FIG. 10 and the scan line $L_4$ of FIG. 8 into the input buffer. Again, the 2×4 pel group is sequentially compared with the patterns 1 through 4, and if the match is found, the eight pel group is replaced by one of the pattern 11 through 14, and the resulting scan line $L_3''$ is stored into the output buffer, as shown in Illustration (E) of FIG. 10.

The bit pattern in the output buffer is supplied to the compression device which compresses the bit pattern of the output buffer, in accordance with a two-dimensional coding scheme such as the CCITT Recommendation T.4.

In the specification, a preprocessing in the horizontal direction was described. But, the preprocess in accordance with the present invention could be easily modified to preprocess the binary image data in the vertical direction. In the preprocessing operation in the vertical direction, transition in each column in the vertical direction is detected, and the step is performed which determines whether a distance between the transition in first column and a transition in second column falls within a predetermined range. Further, the similar operational steps as the steps in the described embodiments are performed to preprocess the binary image data in the vertical direction. The embodiments were directed to preprocess the black pels in the data. But, the invention could be also used to advantage to preprocess image patterns which are "reversed" patterns from those shown in the FIGS. 4A, 4C, 5A, 5C, 6A, 6C and the patterns 1–4 in the FIG. 9. In this case, the white pels are treated as the foreground pels (or image) and the black pels are treated as the background pels. The invention provides the method for preprocessing the image data, which improves efficiency of data compression. In other words, the invention reduces the amount of compressed data.

Of course, many other modifications and substitutions to the foregoing detailed description of the two embodiments could be made without departing from the spirit of the present invention. Some features could be used without the corresponding use of other features. The particular coding scheme described and shown in connection with Table 2 is arbitrary and may be changed to advantage in certain applications. The choice of the thresholds of 3 and X in connection with FIG. 1 may also be adjusted as desired. Thus, the foregoing description should be considered as merely illustrative of the present invention, and not in limitation thereof.

Having thus described the invention, what is claimed is:

1. A method for processing binary image data supplied from an image supply means, in preparation for compression under a two-dimensional coding scheme, the processing method comprising the steps of:
    (a) detecting a first transition in the image data in a first scan line, a second transition in the image data in a second scan line and a third transition in the image data in a third scan line;
    (b) measuring a first distance between said first transition and said second transition and a second distance between said second transition and said third transition;
    (c) rearranging said image data to selectively decrease said first or second distance to a first predetermined value determined in accordance with said first distance and second distance, if neither the absolute value of said first distance nor the absolute value of said second distance is between 3 and X, where X is a predetermined positive integer;
    (d) rearranging said image data to reduce said second distance to a second predetermined value which is larger than said first predetermined value, if either the absolute value of said first distance or the absolute value of said second distance is between 3 and X and the absolute value of said first distance is larger than the absolute value of said second distance;
    (e) rearranging said image data to reduce said first distance to said second predetermined value, if either the absolute value of said first distance or the absolute value of said second distance is between 3 and X and the absolute value of said first distance is smaller than or equal to the absolute value of said second distance; and
    (f) supplying said rearranged image data to a compression means for performing said compression.

2. The method of claim 1 where X is 6.

3. The method of claim 1 where said second predetermined value is 3.

4. The method of claim 1 where said first predetermined value is zero if either said first or said second distance is 1, and is 1 if either said first or said second distance is 2 or 3.

* * * * *